United States Patent [19]

Streichenberger

[11] Patent Number: 4,872,782
[45] Date of Patent: Oct. 10, 1989

[54] ARTIFICIAL SUBSTRATES FOR MARINE BIOMASS ENHANCEMENT AND WAVE ENERGY ABSORPTION

[76] Inventor: Rodolphe Streichenberger, 101 Dahlia Ave., Corona Del Mar, Calif. 92625

[21] Appl. No.: 35,449

[22] Filed: Apr. 7, 1987

[51] Int. Cl.$^4$ .................. E02B 3/00; A01K 61/00
[52] U.S. Cl. ............................ 405/24; 119/3; 119/4; 405/21; 405/23
[58] Field of Search ........... 405/24, 23, 21, 15, 405/16; 119/3, 4

[56] References Cited

U.S. PATENT DOCUMENTS

| | | | |
|---|---|---|---|
| 3,299,640 | 1/1967 | Nielsen | 405/24 |
| 3,323,310 | 6/1967 | Arpin | 405/24 |
| 3,455,278 | 7/1969 | Hunt | 119/4 |
| 3,540,415 | 11/1970 | Bromley | 405/24 X |
| 3,648,464 | 3/1972 | Edwards | 405/24 |
| 3,691,994 | 9/1972 | McPherson | 119/3 |
| 3,881,319 | 5/1975 | Katagiri et al. | 405/50 |
| 4,344,384 | 8/1982 | Rowley | 119/4 |
| 4,490,071 | 12/1984 | Morrisroe | 405/24 |
| 4,508,057 | 4/1985 | Suzuki | 119/3 |

FOREIGN PATENT DOCUMENTS

| | | |
|---|---|---|
| 738639 | 10/1932 | France . |
| 2195396 | 3/1974 | France . |
| 2376623 | 8/1978 | France . |
| 2376916 | 8/1978 | France . |
| 2466192 | 4/1981 | France . |
| 1191614 | 5/1970 | United Kingdom .............. 405/24 |

OTHER PUBLICATIONS

Brochure, Ercon Systems, Inc; Erosion Control (no date).

Primary Examiner—Dennis L. Taylor
Attorney, Agent, or Firm—Lyon & Lyon

[57] ABSTRACT

Artificial substrates for use in open sea enhancing biomass and/or absorbing wave energy, improved by means of particular dispositions and devices concerning their number, mooring, and flotation.

They are associated with affixed sessile algae and shellfish. They can be implanted trustworthily in very rough seas. They fulfill economical requirements for the development of aquacultural farms, aquacultural breakwaters, algae fields and shellfish reefs.

21 Claims, 2 Drawing Sheets

ARTIFICIAL SUBSTRATES FOR MARINE BIOMASS ENHANCEMENT AND WAVE ENERGY ABSORPTION

BACKGROUND

1. FIELD OF INVENTION

In the oceans and notably on soft bottoms the lack of hard substrates is often the limiting factor which prevents fishes and sessile organisms such as algae and shellfishes to settle and develop in fertile waters where light minerals and plankton are present enough for their nurture. Moreover it has been demonstrated in the applicant's previous works, that any immersed structure, natural or artificial, not only attracts the environmental biomass but is a development factor for the biomass.

Hence, immersed structures, either natural, artificial, or a combination of both, have a great potentiality for the biomass enhancement of the oceans. The Art of immersing, positioning and mooring artificial substrates, support-surfaces or structures, as well as the Art of implanting algae fields and shellfishes reefs, is now highly wanted for restoration and development of biomass factors.

Heretofore artificial reefs have utilized for sea enhancement purpose. They are large and heavy structures prefabricated on earth, made of concrete, rocks, iron, chains, plastics and other materials, immersed and settled into the sea at high costs. These artificial reefs aim to attract fishes and give them new habitats.

Unlike artificial reefs, the artificial substrates we are interested in, are light and inexpensive structures with specific support-surfaces on which affix and develop natural structures of algae and shellfishes. These artificial substrates usually weigh hundreds or thousands of times less than artificial reefs. These easily handled and inexpensive artificial structures can affix large natural structures such as giant algae and shellfish clusters which weigh hundreds or thousands of times more than the artificial structure. For a small artificial structure moored in the waters one obtains a great biomass productivity and sometimes a great wave energy absorption.

On Mar. 3, 1987 the U.S. patent application Ser. No. 023,188 of Antonius Streichenberger has described such light and inexpensive artificial substrates with their implanting process and devices, for use on soft bottom in order to settle in open sea large algae and shellfish fields.

In 1979, and independently of any biomass consideration, the hydrodynamic effect and wave energy absorption of tethered buoys, floating near the water surface, have been described by some researchers, notably Richard Seymour University of Calif.

In 1984, and independently of any artificial substrates, the wave energy absorption and tide deflection of natural algae fields have been described by some researchers, notably G.A. Jackson, University of California.

However and so far as I know, no one ever described the wanted characteristics of artificial substrates and associated sessile organisms for operating as biomass factors and/or wave energy absorbers.

OBJECTS AND ADVANTAGES

Accordingly several objects and advantages of my invention is a certain type of artificial substrates which associated with sessile organisms, substantially develop biomass and/or absorb wave energy. These artificial substrates and associated organisms stand closely, in great number and trustworthly in very rough waters. Their closeness, great number and trustworthiness, in rough seas, are the difficult performances the invention hopefully accomplishes in order to reach its purpose.

Consequently, the invention concerns beneficial devices, used separately or altogether, to ensure the moorings or to prevent encounters and entanglements or to speed the implantation of a great number of artificial substrates associated with sessile organisms, particularly algae or shellfishes. Also the invention concerns different dispositions, used separately or altogether, whereby the artificial substrates associated with sessile organisms have a better biomass productivity, or a better wave energy absorption, or a better resistance to the wave activity.

According to a first disposition of the invention the form of the artificial substrate is linear, in order to oppose minima front surfaces to the water motion. The relationship between the length of the artificial substrate and and its average section diameter is a rapport inferior to 0.1 and superior to 0.001. These artificial substrates are made of ropes, tubes, bars, and other lengthy and linear shapes. These linear artificial substrates which stand vertically in the water column place their support-surfaces and associated sessile organisms at different levels in the water where the sessile organisms can pick up their nutrients in a greater volume of water.

For a majority absorption of wave energy, as well as for a high biomass productivity, the artificial substrates and associated organisms have the advantage to stand in the superficial waters where light and energy are strong. An artificial substrate itself can stand in the lower part of the water column while the associated affixed organisms raise up above the artificial substrate, into the water column. The association of a small and low artificial substrate plus a great giant algae can occupy a great height in the water column.

For the achievement of what I call an aquacultural breakwater, the association of linear artificial substrates and sessile organisms has to stand in the water column from about 0 meter down to 5 meters deep at least, or down to 20 meters and more when the waves are great, since it is in the superficial waters that more light and energy are concentrated.

The associated sessile organisms affixed to the artificial substrates can be grown from natural implantation of mussels, for example, or from artificial implantation of oysters or giant algae, for example.

According to another disposition of the invention, the artificial substrates are moored closely on the water bottom, as trees in a forest. The optimum density of linear artificial substrates standing vertically in the water column, depends on both water fertility and waves activity. The breakwater effect is increased by high density. The aquacultural effect is increased by a medium density which promotes a whole vegetal and animal community of associated sessile organisms and also non sessile organisms living in the immediate area, the value of the last happening to surpass the value of the first.

The density of an aquacultural breakwater is measured by dividing said artificial substrate section surfaces by the total bottom surface covered by said artificial substrates. This quotient varies from 0.05 to 0.00025.

According to another disposition of the invention the artificial substrates are flexible. Under water motion, and for their best preservation, the artificial substrates have great advantage to tilt above their moorings from a vertical position to a bent position.

According to another disposition of the invention the artificial substrate's flotation is provided with greater inertia by means of weights placed under the linear support-surfaces of the artificial substrates. If the flotation means are partially emersed above the surface, the inertia increasing weights hang on under said linear support-surfaces. If the flotation means are entirely immersed under the surface, the inertia weights hang on said support-surfaces and partially lay on the water bottom as a chain can do.

The inertia effect of the weights substantially lessen the traction efforts the artificial substrates and associated organisms exercise on the moorings. It is a permanent advantage preventing moorings from attrition, sliding, extraction, or breakage. Also said weights increase the vertical tension between the top and bottom of the support-surface lines. Such increased tension is an advantage which prevents there being encounters and entanglements between linear artificial substrates which are closely moored. Those inertia weights have double advantage as said above. However, under certain condions and to prevent entanglements of said weights into the mooring organs, it is sometimes useful to add rigid bars between the support-surface lines and the mooring organ of an artificial substrate.

According to another disposition of the invention, when the mooring is on a soft bottom, a reversing anchor is deeply buried in the sediments. Also a fast refilling of the excavation dug for the mooring's burying, can be operated with a refilling pipe conveyed pressurized air or water and making collapse the sediments's sides of the excavated hole.

The reversing anchor is buried at a depth which is characterized by its relationship with the height of the artificial substrate plus the associated affixed sessile organisms. The quotient of said depth and height is inferior to 2 and superior to 0.02.

The reversing anchor adds a great strength to mooring organs which are submitted to enormous tractions under big surge. The use of the reversing anchor and refilling pipe, separately or altogether, reduce substantially the implanting process time. When implanting great numbers of artificial substrates the implanting process time can be reduced by half and more due to the given possibility of withdrawing the excavating pipe immediately after excavation has ended, which is not the case with the process described in the Mar. 3, 1987 patent application of Antonius Streichenberger.

We believe these new devices and dispositions are important contribution for the development of artificial substrates the use of which has always been limited because of poor moorings, high drags and expensive implanting processes. Till now the artificial substrate use has been confined to protected areas for high value sea food aquaculture. The new purpose is to use improved artificial substrates in large quantities and in very rough seas as basic instruments for biomass enhancement and wave energy absorption. The artificial substrate's improvement, due to the invention, will benefit sea bio- structuring, a technology dealing with ecological, economical and humanitarian requirements we briefly quote as follows:

1. Enhancement of the sea by means of living structures made of artificial substrates and associated affixed sessile organisms.
2. Extension of the aquaculture to the open sea.
3. Protection of the seashore against wave erosion.
4. Creation in open sea of calm water areas protected by breakwater barriers where aquacultural, industrial and leisure activities can be developed
5. Aquaculture simple technique for supplying new marine ressources to underdeveloped populations with hunger problems.
6. Economical performances whereby a comparatively inexpensive breakwater is paid with the aquacultural income of its own production.

Further objects and advantages of my invention will be apparent from a consideration of the drawings and ensuing description of it.

DRAWING FIGURES

DESCRIPTION

Figure 1:
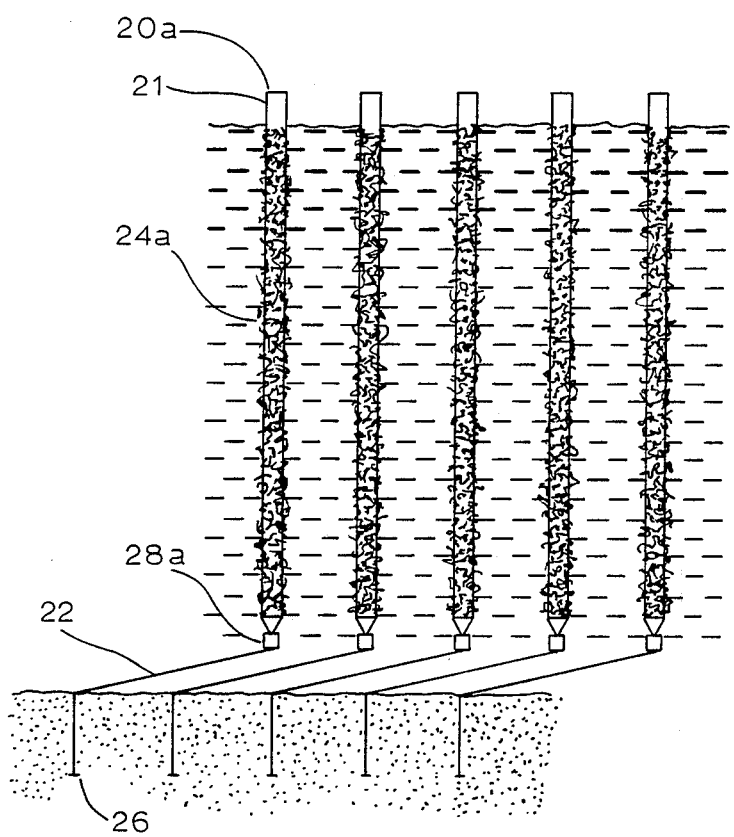
FIG. 1 shows five artificial substrates with associated sessile organisms.

FIG. 1 shows five artificial substrates 20a with associated sessile organisms 24a which belong to a large set of several hundreds of artificial and natural structures forming an aquacultural breakwater. The five units stand at low tide in a 18 meter deep sea with a tide of 4 meters.

Each linear artificial substrate is made of a mooring organ 22 and of a 35 centimeters diameter, 15 meters long polyethylene tube 20a of which the linear coefficient is 0.023.

This aquacultural breakwater density which is the quotient of the artificial substrate sections by the total bottom surface covered by said artificial and natural structures, is 0.01.

Said polyethylene tube 20a forms the support-surfaces 21 for the fixation of associated organisms 24a which are, in the figured case, mussels weighing 375 Kilograms.

Figure 6:
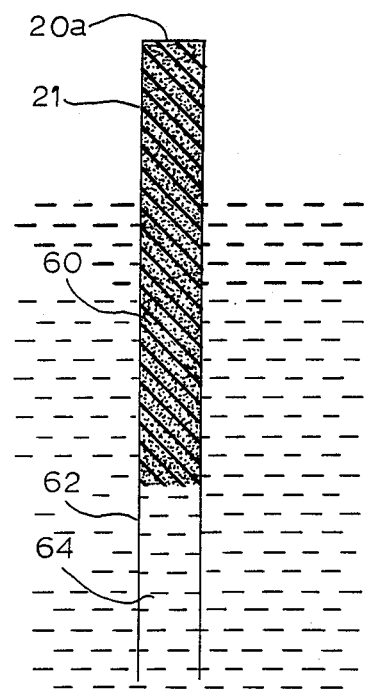
FIG. 6 shows artificial substrate's means of flotation.

As shown in FIG. 6, each unit's flotation is assured by close cell foam 60 filling the inside said tube's upper part in the top 2.5 meters. Due to the holes 62 in tube 20a beneath said foam 60, water 64 fills said tube's inside all along the remaining 12.5 meters of said tube.

Figure 7:
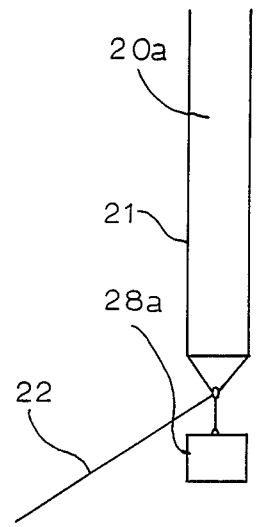
FIG. 7 shows a hanging inertia weight.

As shown in FIG. 1 and FIG. 7, the polyethylene tube 20a is attached at its base to the mooring organ 22 consisting of a 25 millimeters diameter and 9 meters long nylon rope of which 3 meters are buried in the sediments.

Figure 2:
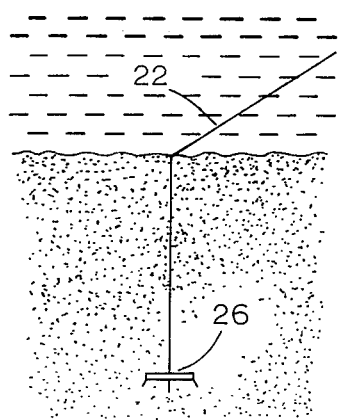
FIG. 2 shows an artificial substrate's mooring with a reversing anchor.
Figure 3:
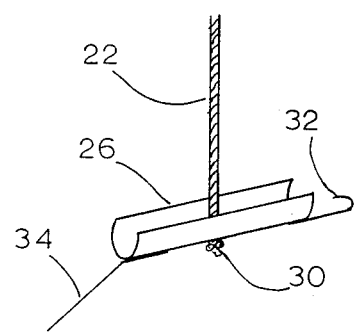
FIG. 3 shows a reversing anchor.

As shown in FIG. 1, FIG. 2, and FIG. 3, at the end of mooring rope 22 is attached a reversing anchor 26 made of 35 centimeters long, 7 centimeters wide, half cylindered galvanized carbon steel piece.

As shown in FIG. 1 and FIG. 7, between the base of the polyethylene tube 20a and the mooring organ 22 hangs thereon a 100 Kilograms cast-iron inertia weight 28a.

The mooring system shown in FIG. 1 is buried in the sediments with a reversing anchor. However this mooring system is not characteristics of FIG. 1 which has been designed for an aquacultural breakwater. When on a rocky bottom for example, there are being substituted other traditional moorings such as concrete blocks, or other mooring means.

FIG. 2 shows the lower part of the artificial substrate's mooring organ which is buried in sediments. The mooring rope 22 is held into the sediments by a reversing anchor 26 the position of which is perpendicular to applied extraction forces.

Figure 4:
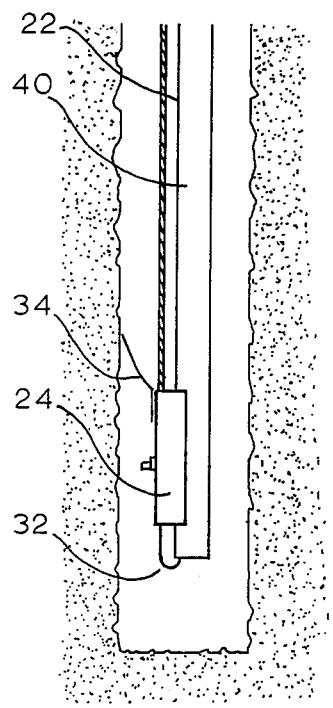
FIG. 4 shows a reversing anchor and an excavating pipe.

FIG. 3 shows the reversing anchor 26 tied to a mooring rope 22 which passes through the middle of said reversing anchor and is stopped on one side by a knot 30 which makes a hinging bond between said rope and reversing anchor. On one extremity of said reversing anchor is a hook 32, on the other extremity is an antenna 34. Said reversing anchor is the anti-extraction device of artificial substrates' mooring organs. Its cylinder shape fits the cylinder shape of the excavating pipe 40 of FIG. 4 along which it is placed during the burying phase. The hook 32 is provided for catching into said excavating pipe's end during the burying. The antenna 34 is provided for driving in and keeping contact with the sediments' sides of the excavated hole as as shown in FIG. 4.

Figure 5:
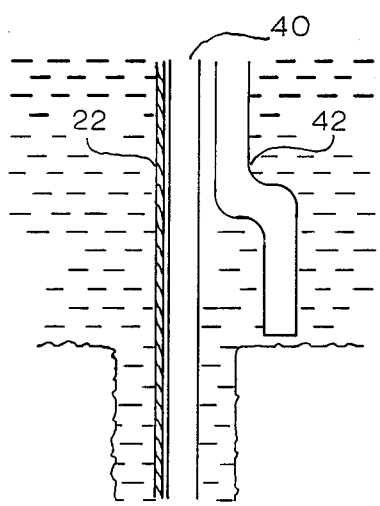
FIG. 5 shows an excavating pipe and a refilling pipe.

FIG. 5 shows the disposition, inside an excavated hole, of the mooring system with a mooring rope 22, reversing anchor 26, hook 32, antenna 34, and with the excavating means which is a pipe 40 conveying pressurized air or water.

While digging a hole in the sediments, by means of air or water jet effect, the excavating pipe 40 goes down into the sediments drawing with itself the artificial substrate's mooring organ comprising said rope, reversing anchor, antenna and hook. Due to said hook 32 caught in said excavating pipe's end, the whole mooring organ sunk into the hole with said excavating pipe. During all the excavation the antenna 34 keeps contact and drives in the sediment's sides of the hole. The said antenna's length is long enough to keep permanent contact with the side of the hole the wideness of it being relatively constant under same air or water jet conditions. Said antenna, made of fiber glass for example, is thin and flexible enough to bend in a curve when driving in the sides of the hole. However, said antenna is rigid enough to prevent the mooring rope from pulling back the reversing anchor when the excavating pipe is withdrawn after the excavating's completion. This means exactly that the rigidity of the antenna is superior to the breakage point of the bond which attaches the rope 22 to the excavating pipe 40, this bond being made for example of thin rubber thread and placed at said pipe's head. Due to this antenna 34, which acts as the first anti-extraction force of the mooring organ and turns the reversing anchor 26 from its vertical burying position towards a position perpendicular to the vertical, so giving to it a full anti-extraction strength, the excavating pipe 40 can be withdrawn immediately after the excavation's completion, without incurring the risk of pulling back the mooring organ off the sediments FIG. 5 shows an upper portion of the excavating pipe 40 with the mooring rope 22, which are near the sedimentary bottom and are provided with a juxtaposed refilling pipe 42 conveying pressurized air or water.

When excavating has ended, the pressurized air or water of said excavating pipe is stopped and said refilling pipe starts blowing pressurized air or water on the upper sides of the excavated hole, causing the immediate collapse of the sediments down to the bottom of the hole, so accelerating the sediments refilling of the hole, which otherwise in natural way takes several seconds or minutes.

These devices of the reversing anchor and refilling pipe can be operated separately or altogether. They can cut by half and more the implanting time otherwise necessary. In the Mar. 3, 1987 patent application of Antonius Streichenberger for example, the process implanting time is substantially handicapped by waiting for the hole's sides natural collapsing and refilling, before which the foreseen anti-extraction devices are not efficient.

Figure 8:
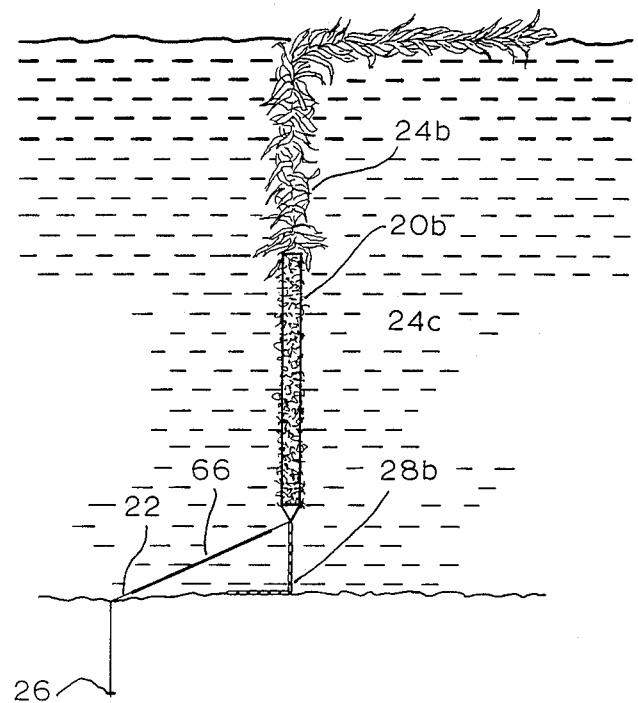
FIG. 8 shows a chain-like inertia weight below a non emerging artificial substrate.

FIG. 8 shows a tube-like artificial substrate 20b which is entirely immersed in a 15 meters deep sea at low tide, and which is surmounted by an associated sessile organism, the Macrocystis giant algae 24b, emerging at the water surface. At high tide the flotation level of said tube-like artificial substrate is the same that at low tide, but the flotation of said algae rises up with the tide, so that the artificial substrate and associated sessile organisms are permanently standing all along the water column from the water surface down to the base of said artificial surface.

The inertia weight consists in a chain 28b hanging on the artificial substrate and partially laying on the bottom. This said chain stabilizes the floating level of this artificial substrate and associated sessile organisms, algae 24b and mussels 24c.

The rigid bar 66 prevents entanglement between the rope mooring 22 and the chain 28b.

Thus the reader will see that the artificial substrates of the invention provide highly reliable yet economical devices which can be used to develop biomass and/or absorb wave energy.

While my above description contains many specificities, these should not be construed as limitations on the scope of the invention, but rather as an exemplification of preferred embodiments thereof. For example, said artificial substrates can be used in freshwater lakes and rivers; said artificial substrates plus associated sessile organisms can be centimeters or deca meters high; said artificial substrates can be the only substrates on which are affixed solid shellfish reefs or flexible algae fields.

The invention is expected to serve the needed development of a sea biostructuring technology.

Accordingly, the scope of the invention should be determined not by the embodiments illustrated but by the appended claims and their legal equivalents.

I claim:

1. An artificial substrate for increasing biomass in a body of water comprising:
    a plurality of substrate units, each of said substrate units comprising a buoyant tube connected by a flexible line to a bottom mooring and separated from adjacent substrate units so as to achieve a predetermined implantation density; and
    sessile organisms attached to each of said substrate units.

2. The artificial substrate according to claim 1 wherein the predetermined implantation density is a ratio between a combined surface area of all of said substrate units and a total planted bottom area, said ratio being less than 0.05.

3. The artificial substrate according to claim 2 wherein the predetermined implantation density is greater than 0.00025.

4. The artificial substrate according to claim 1 wherein said substrate units have a width to length ratio of between 0.1 and 0.001.

5. The artificial substrate according to claim 1 wherein each buoyant tube is comprised of a hollow plastic member having a first portion connected to said bottom mooring and a second portion containing a buoyant element, said buoyant tube being floatable in a substantially vertical orientation.

6. The artificial substrate according to claim 2 wherein said first portion of said buoyant tube has perforations therein.

7. The artificial substrate according to claim 1 wherein said bottom mooring is comprised of an elongated element buried in bottom sediment, said flexible line being secured to approximately the middle of said elongated element.

8. The artificial substrate according to claim 7 wherein said elongated element is comprised of a hollow tubular element split lengthwise into a half cylinder shape.

9. The artificial substrate according to claim 1 wherein the sessile organisms are selected from the group consisting of: mussels, oysters, kelp, seaweed, shellfish and the like.

10. A method for anchoring a substrate unit formed of a buoyant element secured to an anchor unit by a flexible line to a sediment bottom of a body of water, comprising the steps of:
    positioning the anchor unit adjacent and lengthwise parallel to an excavating pipe;
    hooking a first end of the anchor unit to a lower end of the excavating piper;
    lowering the excavating pipe with the anchor unit adjacent thereto into the bottom of the body of water while forcing fluid through the pipe and out the lower end;
    discontinuing the forcing of fluid and removing the pipe from the anchor unit and raising the pipe out from the floor; and
    rotating the anchor unit from a position parallel to a vertical direction to a position perpendicular to the vertical direction.

11. The method for anchoring a substrate unit according to claim 10 wherein the step of rotating the anchor unit comprises attaching an extension on a second end of the anchor unit for preventing extraction of said anchor without rotation thereof by contacting the extension with floor material.

12. The method for anchoring a substrate unit according to claim 10 further comprising forming said anchor unit from an elongated element, attaching the flexible line to approximately the middle of the elongated element, and positioning said anchor unit somewhat concentrically about the excavating pipe during the step of lowering.

13. The method for anchoring a substrate unit according to claim 12 further comprising forming the elongated element from a tubular element split lengthwise into a half cylinder shape.

14. A method for developing biomass in a body of water by means of artificial substrates and associated sessile organisms, comprising the steps of:
    juxtaposing vertically under the surface of the water a plurality of elongated buoyant structures which are connected by flexible lines to water bottom moorings; and
    associating sessile organisms with said structures by means of aquaculture processes.

15. The method for developing biomass according to claim 14 wherein the step of associating sessile organisms comprises attaching sessile organisms consisting of: mussels, oysters, kelp, seaweed, shellfish and the like to the elongated buoyant structures.

16. A method for absorbing water energy comprising developing biomass in a body of water by means of artificial substrates and associated sessile organisms, comprising the steps of:
    juxtaposing vertically under the surface of the water a plurality of elongated buoyant structures which are connected by flexible lines to water bottom moorings; and
    associating sessile organisms with said structures by means of aquaculture processes.

17. The method of absorbing water energy according to claim 16 wherein the step of associating sessile organisms comprises attaching sessile organisms consisting of: mussels, oysters, kelp, seaweed, shellfish and the like to the elongated buoyant structures.

18. The artificial substrate according to claim 1 further comprising a rigid portion over a section of the flexible line.

19. The artificial substrate according to claim 1 wherein the buoyant tube is held by the flexible line at a predetermined level.

20. The method of claim 14 further comprising the step of: harvesting a desired quantity of sessile organisms.

21. The method of claim 14 further comprising the step of: positioning the elongated buoyant structures at predetermined levels.

* * * * *